UNITED STATES PATENT OFFICE.

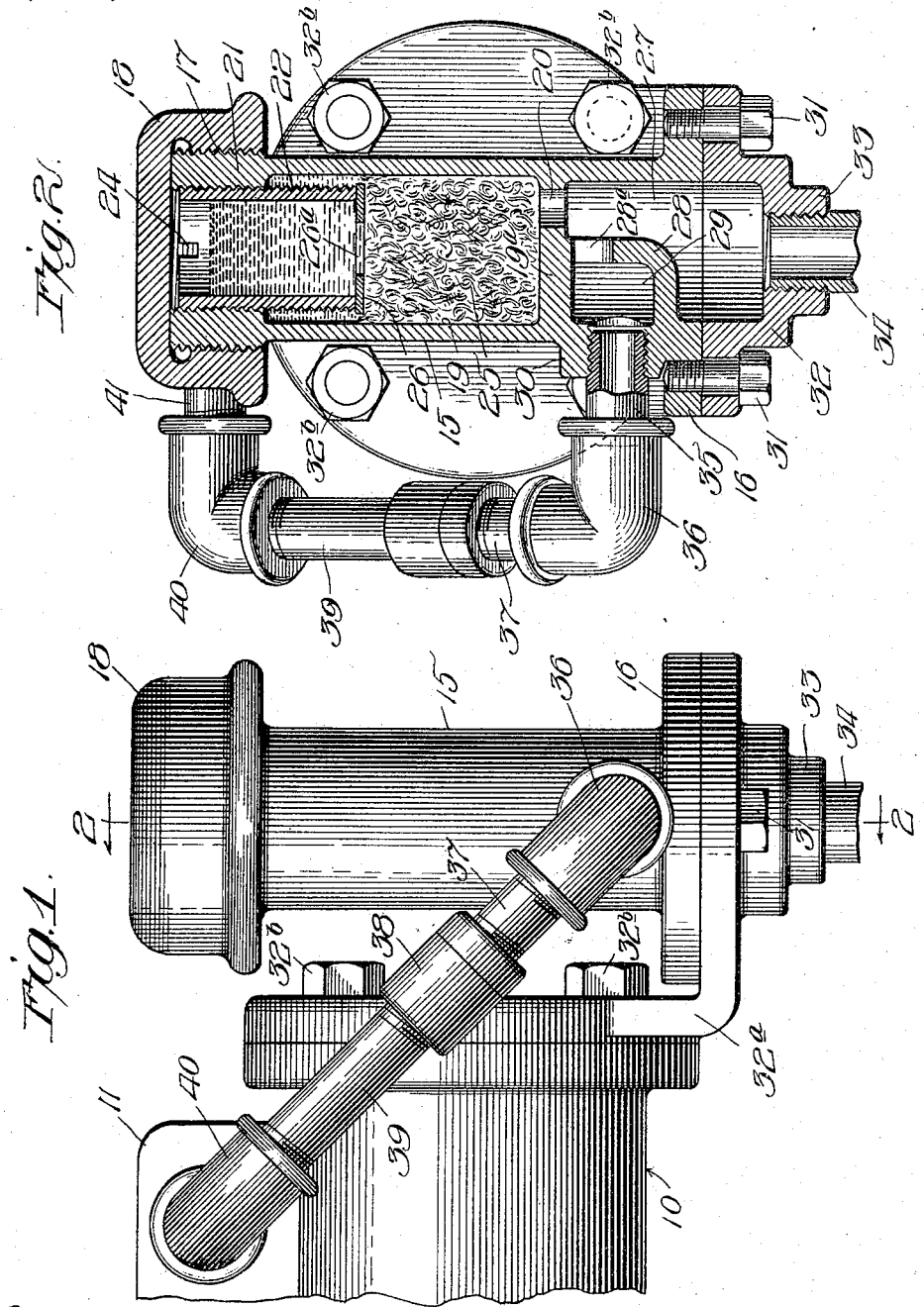

ALBERT J. GATES, OF CHICAGO, ILLINOIS, ASSIGNOR TO HANNA ENGINEERING WORKS, OF CHICAGO, ILLINOIS, A CORPORATION OF ILLINOIS.

LUBRICATOR.

1,211,431.   Specification of Letters Patent.   Patented Jan. 9, 1917.

Application filed April 8, 1913.   Serial No. 759,594.

*To all whom it may concern:*

Be it known that I, ALBERT J. GATES, a citizen of the United States, residing at Chicago, in the county of Cook and State of Illinois, have invented certain new and useful Improvements in Lubricators, of which the following is a specification.

This invention relates to improvements in a lubricator and has for its object to provide an improved lubricator adapted for use with a fluid motor, more specially a motor operated by compressed air.

It has been found that the compressed air motor employing a reciprocating piston required lubrication more than in the case of the ordinary steam engine, and it is the object of my invention to provide an improved lubricator which may be inserted in the air line to cause the air operating the motor to supply lubricant thereto.

Another object is to provide a lubricator which will feed only when the motor to be lubricated is running. I attain this object by utilizing a suction applied to the lubricant container through a flow impeding means, this suction being created by the flow of air to the motor.

Other objects will be set forth and made apparent in the following specification and accompanying drawings, in which, Figure 1 is a side elevation of my improved lubricator, applied to an air motor; Fig. 2 is a vertical section along the line 2, 2 of Fig. 1.

Like numerals refer to like elements throughout the drawings, in which—

10 designates an ordinary form of air cylinder in which is reciprocably mounted, an ordinary form of piston and rod not shown. Secured to the cylinder 10 is the valve chamber 11, adapted to direct the flow of air to the interior of the cylinder 10; 15 designates generally my lubricator, having the bolting base flange 16 and the upper externally threaded shoulder 17, to which is threadedly secured the cap 18. This lubricator 15 is formed with the chamber 19 therein, having the restricted outlet 20 in the base thereof. Formed in the upper periphery of the chamber 19 is the internally projecting threaded shoulder 21. A sleeve 22, externally threaded to engage the threaded shoulder 21 depends in the chamber 19 as shown in Fig. 2. This sleeve 22 is slotted as indicated by 24 in its top to permit engagement by a wrench or screwdriver to adjust its position in the chamber 19. Chamber 19 is provided with a mass of material 25, such as hair, waste or other spongy material which may be compressed and which will impede the flow of fluid therethrough, this impeding action being controlled by the amount of compression of the waste. A washer or collar 26 contacts with the bottom of the sleeve 22 and is maintained in close contact with the spongy material 25, which is compressed by the washer an amount sufficient to impede the flow of oil through the waste, except as desired. Washer 26 is provided with the restricted aperture $26^a$ therethrough. Below the base $19^a$ of the chamber 19 is provided a vertical passage 27, shown as in alinement of the aperture 20. A dividing wall 28, extends downwardly from the base $19^a$ and is provided with the aperture $28^a$ therein communicating with a horizontal passage 29 leading through an internally threaded boss 30. Secured by bolts 31, to the bolting flange 16 is the cap 32 having the depending internally threaded boss 33. An air supply pipe 34 is threadedly secured in the boss 33 and communicates therethrough with the passage 27. A threaded nipple 35 is located in the boss 30 and is secured by its opposite extremity to the elbow 36 which in turn communicates through the pipe 37, union 38, pipe 39, elbow 40 and nipple 41, with the valve chamber 11 so that the air flows through such pipe line from the air supply pipe 34, passage 27 and angularly disposed passage 29. Cap 32 is provided with the angular bracket arm $32^a$ which is secured by bolts $32^b$ to cylinder 10.

In the use of my device, I remove the cap 18, adjust the sleeve 22 to compress the hair or other spongy material 25 the desired amount and fill the chamber 19 above the material 25 with fluid lubricant. The cap 18 is then replaced and serves to hermetically seal the chamber 19. As the air flows through the passages 27 and 29 and by aperture 20, suction created by such flow will operate to draw oil from the compressed waste or hair 25, and at the same time the oil will be comminuted and mixed with the air supplied to the cylinder and a maximum lubrication will be obtained for a minimum of oil. The comminuted lubricant will be distributed over the interior of the air cylinder 10, thereby serving to lubricate the contacting surfaces. By screwing the sleeve 22 down to tightly compress the material 25, flow of the oil by gravity through the same will be practically prevented. It will thus be obvious that the oil will not flow in any substantial quantity except when air is flowing to the motor and the latter is in operation, at which time lubrication is necessary. As oil is drawn from the material 25, capillarity will cause it to be replaced thus providing for a constant supply.

It is apparent that my device is susceptible of changes of construction which it is not feasible to show or describe in this application and I do not wish to be restricted to my showing or description beyond the scope of the appended claims.

What I claim is:—

1. In combination with a fluid conduit, a lubricator comprising a lubricant containing chamber, said lubricator being provided with a duct communicating with said conduit, means to substantially normally prevent flow of lubricant through said duct, said means comprising fibrous material closely compressed so that lubricant will flow therethrough substantially only upon passage of fluid through said conduit, and means to compress or pack said material in said duct.

2. In combination with a fluid conduit, a lubricator comprising a lubricant containing chamber, said lubricant being provided with a duct communicating with said conduit, means to substantially normally prevent flow of lubricant through said duct, said means comprising fibrous material closely compressed so that lubricant will flow therethrough upon passage of fluid through said conduit, and means to maintain said material in compressed condition.

3. In a device of the class described, a lubricator having a chamber and a passage leading therefrom, said lubricator being adapted to be attached to a fluid conduit so that said passage will communicate with the latter, flow impeding means carried in said chamber, a sleeve located therein and bearing on said material, and a cap threadedly attached to said lubricator to close one end of the same.

4. In a device of the class described, a fluid conduit, a lubricator in communication therewith, said lubricator being provided with a chamber therein and a threaded shoulder in said chamber, a pressure member externally threaded and engaging said threaded shoulder, said chamber having an outlet communicating with said conduit, means located in said chamber to substantially prevent the flow of oil from said chamber to said air conduit, except when fluid is flowing through said conduit.

5. In combination with a fluid conduit, a lubricator having a passage therethrough communicating with said conduit, flow impeding material carried in said lubricator, and means to compress said material, said means comprising a sleeve, said sleeve being arranged to contain lubricant.

6. In combination with a fluid conduit, a lubricator having a passage therethrough communicating with said conduit, flow impeding material carried in said lubricator, means to compress said material, said means comprising a sleeve, and a perforated member bearing upon said material, said sleeve being in contact with said member.

7. In a device of the class described, a lubricator having a passage therethrough and an oil chamber therein communicating with said passage, means to impede the flow of oil from said chamber into and through said conduit, a flanged cap secured to said lubricator, an air pipe secured to said cap and communicating with said passage, a second pipe secured to said lubricator and communicating with said passage.

8. In a device of the class described, a lubricator having a passage therethrough and a chamber therein communicating with said passage, means to impede the flow of oil from said container into and through said chamber, a flanged cap secured to said lubricator, an air pipe secured to said cap and communicating with said passage, a second pipe secured to said lubricator and communicating with said passage, and an apertured dividing wall in said passage.

In testimony whereof, I have subscribed my name.

ALBERT J. GATES.

Witnesses:
HENRY A. PARKS,
HELEN FREUND.

Copies of this patent may be obtained for five cents each, by addressing the "Commissioner of Patents, Washington, D. C."